(No Model.)
F. F. DEARING.
CLUTCH.
No. 370,860.  Patented Oct. 4, 1887.
Fig. 1.
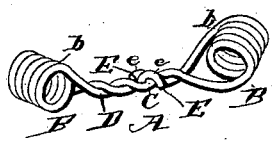
Fig. 3.
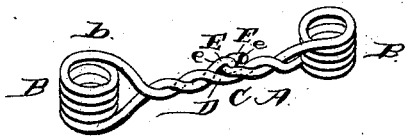
Fig. 4.
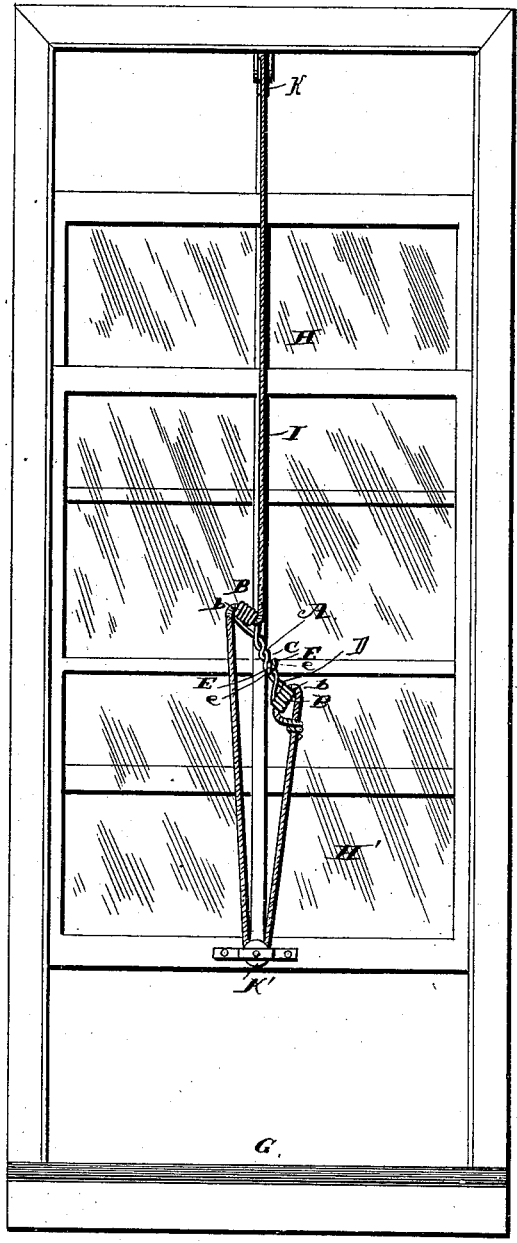
Fig. 2.
Witnesses
Geo. Thorpe
C. E. Doyle
Inventor
F. F. Dearing
By his Attorneys
C. A. Knowles

UNITED STATES PATENT OFFICE.

FOUNTAIN FARIS DEARING, OF BELLBUCKLE, TENNESSEE.

CLUTCH.

SPECIFICATION forming part of Letters Patent No. 370,860, dated October 4, 1887.

Application filed June 20, 1887. Serial No. 241,891. (No model.)

*To all whom it may concern:*

Be it known that I, FOUNTAIN FARIS DEARING, a citizen of the United States, residing at Bellbuckle, in the county of Bedford and State of Tennessee, have invented a new and useful Improvement in Clutches, of which the following is a specification.

My invention relates to an improvement in clutches for use in adjusting cords or ropes—as in window-sash balances, guy-ropes for tents, &c.. In short, the said improved clutch is adapted to be used in any situation where it is desirable and necessary to have means for the ready and sure adjustment of cords or ropes. It is usual to provide for this purpose a wooden block having a transverse perforation in each end at right angles to the length of the said block, in one of which is secured the end of the cord, and through the other of which passes the running line or main body of the cord. The weight or strain upon the cord holds the clutch almost parallel with the length of the cord, and therefore the portion of the said cord which passes through the transverse opening therein is bent at right angles on each side of the said clutch, and is thus held from slipping through and coming out of the proper adjustment. It sometimes happens that the opening through the clutch becomes smooth by constant use, or so much enlarged by wear as to allow the cord to slip through easily, thus rendering it useless; and, also, a sudden strain upon the cords is liable to break the clutch or to pull out the portion of material between the perforation and the end thereof.

My improved clutch is made of wire, and is designed to obviate the objections just mentioned, and also to be very easily and cheaply manufactured.

In the drawings hereto annexed is illustrated my improved clutch, showing its application to a window-sash holder, in which—

Figure 1 is a perspective view of the clutch. Fig. 2 is a front view of a window, showing the manner of using the clutch on the supporting-cord for the sashes. Fig. 3 is a detail view of a clutch in which the loops at the ends are arranged at right angles to the length thereof instead of inclined, as in Fig. 1. Fig. 4 is a similar view of a wooden clutch provided with the inclined perforations or openings for the cord.

Referring by letter to the drawings, A designates the improved clutch, formed of a single piece of wire and comprising the loops or openings B B at the ends, formed by the coils of wire $b$ $b$, and the twisted shank C, comprising the portion D of wire, extending between the loops B B and the two free ends E E of the wire, which are formed into loops $e$ $e$ and joined together.

It will be seen that the coils are not arranged so that the opening therethrough is at right angles to the length of the clutch. The centers of the coils are arranged on an inclined line, thus making the opening in the loop inclined. It is designed to dispose the clutch on the cord in such a manner that the portion of the cord which passes through the loop will be bent at an angle greater than a right angle, and thus make the engagement of the clutch more secure. Also, the openings made by the coils are oppositely inclined, as will be seen, thus making the bend in the cord, formed by passing through the said opening, very abrupt.

When the clutch is manufactured, the end loops are coiled, leaving a straight portion, D, of wire between the same. The ends E of the wire, after forming the coils, are then carried toward each other and provided with integral loops $e$ $e$ on the extremities, which are engaged, thus connecting the said ends E E. The coils B B are then turned in opposite directions, thus twisting the portion D and the ends E E tightly together and forming a strong shank, C.

The advantage gained by this construction is as follows: The inner sides of the loops B are ribbed or corrugated, thus providing rounded edges to bite firmly on the cord. The surface of the said cord or rope is always more or less uneven, and the ribs on the inside of the loops fit into the irregularities of the same and obtain a very strong hold. There are no sharp or rough edges in this clutch to catch and injure the cord, and therefore when the clutch is raised to enable it to slip along the cord to another adjustment the cord will pass through the loop very readily.

In the second figure of the drawings one application of the clutch is illustrated—namely, its use in connection with the cord of a sash-balance, in which—

G represents the casement of the window; H H', the upper and lower sashes, respectively; and I, the cord, secured at one end to the top rail of the upper sash, passing around a pulley, K, at the top of the casement, extending down and passing around a pulley, K', on the bottom rail of the lower sash, and secured at the other end to the improved clutch A. The end of the cord is secured in one end of the clutch, and the main or running portion of the cord passes through the loop at the other end. The said running portion comprises the part of the cord which is between the pulleys K and K'.

Fig. 3 shows a clutch made of wire and in the manner hereinbefore described, except that the loops are not inclined. In certain situations this latter form is preferable; but at the same time the form shown in Figs. 1 and 2 takes a stronger hold of the cord.

In Fig. 4 is shown an ordinary wooden clutch, to which the inclined perforations are applied, and it will be seen that the said inclined perforations or openings may be used with great advantage even in the ordinary forms of clutches.

When inclined openings are used in wooden or metal clutches of the ordinary form, I prefer to form a shallow groove, L, in the side thereof above the said inclined openings to receive and guide the cord, to prevent the same from slipping off to the side or becoming in any way displaced.

The clutch, as described, is very light, is ornamental, and can be made very small, and will still be strong and effective.

The ribs on the inner sides of the openings in the clutch, formed by the coils, serve as biting-edges to engage the cord and hold it firmly.

Having thus described the construction, operation, and advantages of my invention, I claim—

1. The herein-described clutch, constructed of wire and having the loops B B, composed of the coils $b\ b$, at its ends, substantially as specified.

2. The herein-described clutch, composed of a single piece of wire and having the loops B B, formed by the coils $b\ b$, and the shank C, comprising the intermediate portion, D, and the ends E E of the wire, which are provided with engaging-loops, the said portion D and the ends E being twisted firmly together, substantially as and for the purpose specified.

In testimony that I claim the foregoing as my own I have hereto affixed my signature in presence of two witnesses.

FOUNTAIN FARIS DEARING.

Witnesses:
ZACKRY TAYLOR BEACHBOARD,
GEORGE BACON MOON.